(No Model.)
S. J. GRAHAM.
VEHICLE SPRING BRACE.
No. 466,675. Patented Jan. 5, 1892.
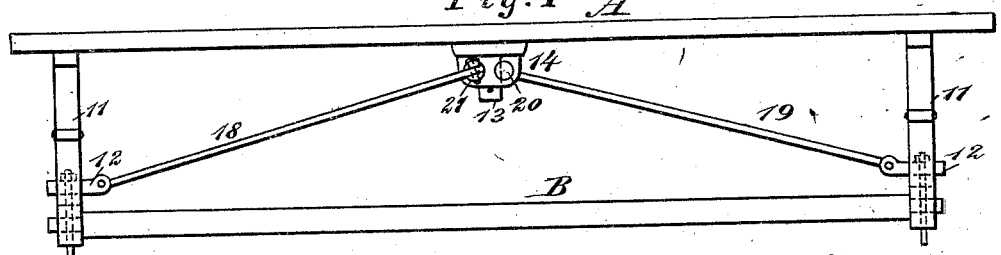
Fig. 1
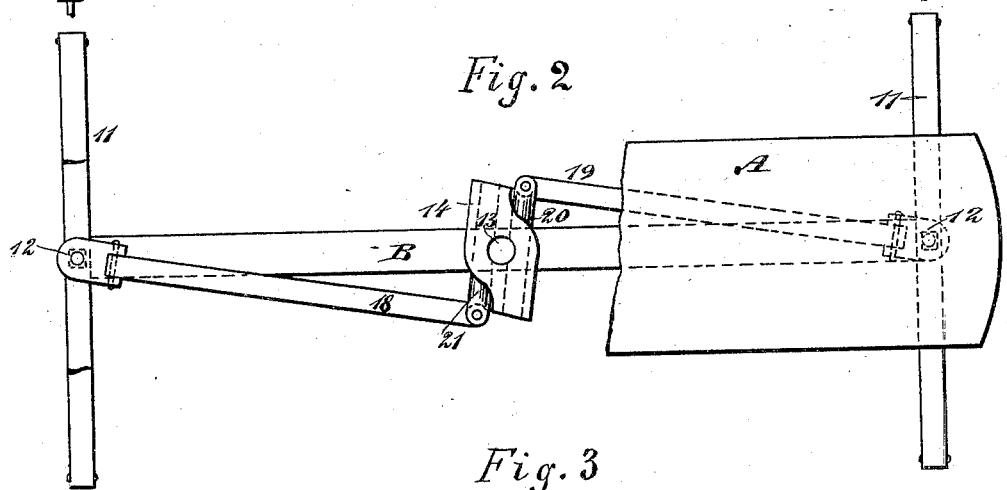
Fig. 2
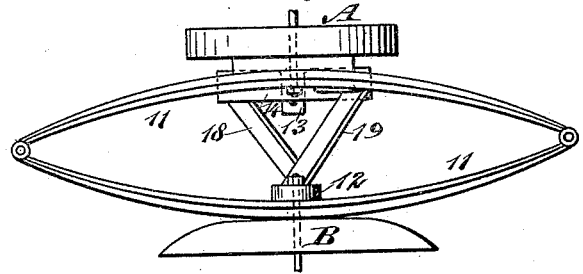
Fig. 3
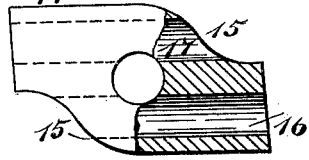
Fig. 4.
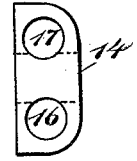
Fig 5
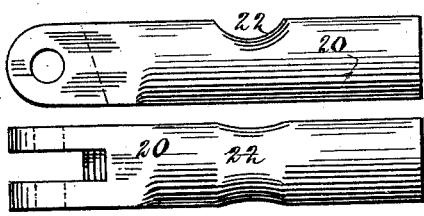
Fig. 6.
WITNESSES:
J. A. Bergstrom
C. Sedgwick
INVENTOR
S. J. Graham
BY
Munn & Co
ATTORNEYS.
Fig. 7
THE NORRIS PETERS CO., PHOTO-LITHO., WASHINGTON, D. C.

UNITED STATES PATENT OFFICE.

SIDNEY J. GRAHAM, OF COLVILLE, WASHINGTON.

VEHICLE-SPRING BRACE.

SPECIFICATION forming part of Letters Patent No. 466,675, dated January 5, 1892.

Application filed October 2, 1891. Serial No. 407,546. (No model.)

*To all whom it may concern:*

Be it known that I, SIDNEY J. GRAHAM, of Colville, in the county of Stevens and State of Washington, have invented a new and Improved Guide and Brace for Vehicle and Seat Springs, of which the following is a full, clear, and exact description.

My invention relates to a combined spring guide and brace especially adapted for use in connection with vehicle-body springs and the springs of vehicle-seats.

The object of the invention is to provide a simple, durable, and economic device capable of convenient application to any vehicle, whereby the springs will be prevented from swaying out of perpendicular and thereby breaking, and to so construct the device that no matter what weight or load is located on one side of the wagon or one side of the seat the springs will always settle in a true perpendicular line, all side strain being avoided.

The invention consists in the novel construction and combination of the several parts, as will be hereinafter fully described and claimed.

Reference is to be had to the accompanying drawings, forming a part of this specification, in which similar letters and figures of reference indicate corresponding parts in all the views.

Figure 1 is a side elevation of the device, illustrating it applied to the vehicle. Fig. 2 is a plan view thereof, a portion of the vehicle to which it is attached being broken away. Fig. 3 is an end view of the device. Fig. 4 is a partial plan and a partial sectional view of the swivel-block of the device, and Fig. 5 is an end elevation of said block. Fig. 6 is a plan view of a pivot-pin adapted to enter the swivel-block, and Fig. 7 is a side elevation of the said pin.

The strip A may represent the under face of a wagon-bed, and the bar B the axle; or the strip may be said to represent the under side of a spring wagon-seat, and the bar B the connecting medium between the seat and the wagon-body. The springs 11 employed are preferably elliptical, and are, as illustrated, attached at their central portions to the strip A and bar B at or near the extremities thereof. At the central portion of the lower section of each spring an inwardly-extending clip or bracket 12 is secured, and upon the under face of the strip A, preferably at its center, a downwardly-extending stud 13 is located. Upon this stud a block 14 is centrally pivoted, the block having somewhat of a swivel movement around the post. This block at opposite diagonal corners is cut away upon ogee lines, forming curved recesses 15, and the block is further provided at each side of its central portion with a longitudinal bore extending through from end to end, the bores being designated, respectively, as 16 and 17. The bores intersect or lead into the central aperture of the block receiving the post 13.

In the inner extremity of each bracket 12 the outer end of a link is pivoted, said links being respectively designated as 18 and 19. These links are led upward to opposite sides of the block 14, as shown in Fig. 2, the link 19 being pivotally connected with the outer end of a pin 20 and the link 18 with the outer end of a pin 21. The pins 20 and 21 are of a like construction, and are shown in detail in Figs. 6 and 7, in which it will be observed that the pins are round in cross-section, except at their central portions, at which point they are provided in one side surface with a semicircular recess 22, extending from top to bottom. The pins are adapted to enter the bores 16 and 17 in the block 14 and to turn freely therein. When the pins are in position within the block, their recesses 22 are immediately opposite the central aperture in the block through which the post 13 passes— that is, the post 13 will enter the recesses 22 of the pins when the block has been placed in position, as the pins are inserted into the block before it is placed upon the post. The block is prevented from slipping from the post by means of a cotter-pin, bolt, or its equivalent.

It will be observed that the links through the medium of the pins 20 and 21 connect with the block 14 at opposite ends thereof, and that the block is capable of rotary movement around its post and the pins of rotary movement within the block.

Thus it is evident that when a weight is applied at one end of a wagon-seat or at one side of a wagon-bed sufficient to press down the spring at that side the block 14 will act as an equalizer and effectually prevent the seat or the body of the vehicle, as the case may be, from swaying laterally and carrying the springs in the same direction, and that as the seat or the wagon-body is compelled to fall or yield vertically the members of the spring will be carried toward one another in a perfect perpendicular plane.

The invention is exceedingly simple and economic, and is capable of ready attachment to vehicles of any type.

The recesses 22 in the pins 20 and 21 serve to prevent the pins from being withdrawn from the block when tension is exerted upon their extremities.

Having thus described my invention, I claim as new and desire to secure by Letters Patent—

1. In a device of the character described, the combination, with the springs and the article supported thereby and with which they are connected, of a block pivoted to the supported article and provided with longitudinal bores on each side of its center, brackets secured to the springs and extending inward therefrom, pins held in the bores of the block by the pivot of the said block and projecting beyond the ends of the same, and links pivoted to the projecting ends of the pins and to the brackets, substantially as described.

2. The combination, with a wagon-seat and springs secured thereto, of a stud projecting downward from the seat, a block held to turn upon the stud, provided with bores, one at each side of the center, pins held to turn in the bores, said pins being provided with recesses in one face to receive the post, brackets attached to the lower members of the springs, and links pivotally connected with the brackets, extending beyond opposite ends of the blocks and having pivotal connection with the pins, as and for the purpose specified.

SIDNEY J. GRAHAM.

Witnesses:
E. D. MINER,
H. H. HOGANSON.